Patented Aug. 3, 1943

2,326,068

UNITED STATES PATENT OFFICE 2,326,068

INTERMEDIATES FOR ESTROGENIC THERAPEUTIC AGENTS

Ewald Rohrmann, Indianapolis, Ind., assignor to Eli Lilly and Company, Indianapolis, Ind., a corporation of Indiana No Drawing. Application December 26, 1941, Serial No. 424,472

3 Claims. (Cl. 260—590)

This invention relates to intermediates for estrogenic therapeutic agents and the methods of preparing those intermediates.

Heretofore methods have been proposed for the preparation of estrogenic therapeutic agents, such as stilbestrol. These methods involve elaborate procedures, are expensive to practice, and result in small yields.

In accordance with this invention, estrogenic therapeutic agents are prepared from new intermediates by a method which is relatively simple, efficient and economical in operation, and results in relatively large yields.

The method in accordance with this invention and the process of preparing the new intermediates of this invention are as follows:

A p-alkoxyphenyl-p-alkoxystyryl ketone having the following formula is first prepared:

(1) 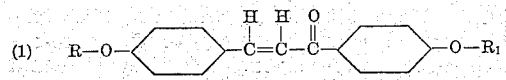

in which R is a monovalent saturated aliphatic organic radical and $R_1$ is a monovalent saturated aliphatic organic radical. Preferably R and $R_1$ do not contain more than six carbon atoms. For example, R or $R_1$ may be methyl, ethyl, propyl, or isoamyl. The p-alkoxyphenyl-p-alkoxystyryl ketone may be prepared by reacting a composition having the formula:

(2) 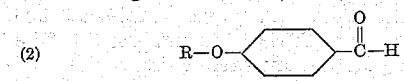

with a composition having the following formula:

(3) 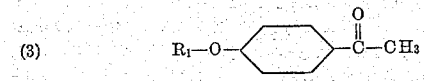

in the presence of a base consisting of the alkali metal hydroxides and alkali metal alkoxides, such as potassium hydroxide, sodium hydroxide, sodium methoxide or sodium ethoxide.

The p-alkoxyphenyl-p-alkoxystyryl ketone is reacted with hydrogen peroxide in an alkaline solution and preferably a solution of an alkali metal hydroxide, such as a solution of sodium or potassium hydroxide. To avoid large volumes of solution, the concentration of the hydrogen peroxide is relatively strong, for example, a water solution of 20 to 30 percent hydrogen peroxide. Desirably, the reaction solution is cooled, since the reaction is exothermic and the temperature is maintained desirably below 50° C. The reaction which takes place may be represented by the following equation:

(4) 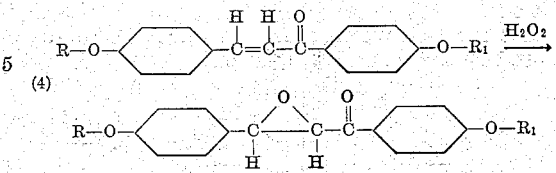

The resulting composition, which is 1,3-di-(p-alkoxyphenyl)-1,2-epoxypropanone-3, is first dissolved in a suitable solvent, such as ethanol, methanol, or propanol, and to this solution of the composition is added a strong aqueous solution of an alkali metal hydroxide, such as sodium hydroxide, potassium hydroxide, or lithium hydroxide. Desirably, the concentration of this alkali metal hydroxide is such that it results after addition in a concentration of the alkali metal hydroxide in the reaction mixture of between 3 and 5 percent. The reaction mixture is heated, preferably by refluxing for several hours. During this time p-alkoxyphenyl-p-alkoxybenzyl glycollic acid is formed. The reaction mixture is then diluted with a quantity of water. Any alkali insoluble material is removed by suitable means, such as filtration or centrifugation. To the solution of alkali soluble reaction mixture is added sufficient mineral acid to precipitate the desired compound, which is p-alkoxyphenyl-p-alkoxybenzyl glycollic acid. The reaction which takes place may be represented by the following equation:

(5) 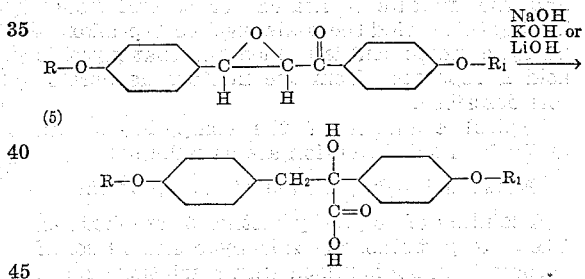

The p-alkoxyphenyl-p-alkoxybenzyl glycollic acid is then oxidized to produce p-alkoxyphenyl-p-alkoxybenzyl ketone. The oxidation is desirably performed by treating the p-alkoxyphenyl-p-alkoxybenzyl glycollic acid with chromic acid or lead tetracetate. If lead tetracetate is employed, the p-alkoxyphenyl-p-alkoxybenzyl glycollic acid is dissolved in glacial acetic acid, cooled, and to the solution is added while agitating the mixture, red lead ($Pb_3O_4$). Desirably, the red lead is added in small portions to the solution of the glycollic acid. The temperature is permitted to rise to not greater than 100° C. before external cooling is employed. After the reaction is completed any excess lead tetracetate is eliminated by the addition of glycerin or ethylene glycol to the mixture. The excess lead tetracetate oxidizes the glycerin or ethylene glycol. The reaction mixture is then diluted with water whereby the p-alkoxyphenyl-p-alkoxybenzyl ketone is precipitated.

If chromic acid is employed as the oxidizing agent, the p - alkoxyphenyl-p-alkoxybenzyl glycollic acid is dissolved in acetic acid and to this solution is added an excess of chromic acid, for example, that prepared by dissolving the chromic anhydride in 80 percent acetic acid. The mixture is agitated for a short period of time and the reaction mixture diluted whereby the p-alkoxyphenyl-p-alkoxybenzyl ketone is precipitated and the ketone is removed by any convenient means, such as filtration or centrifugation.

The reaction which takes place may be represented by the following equation:

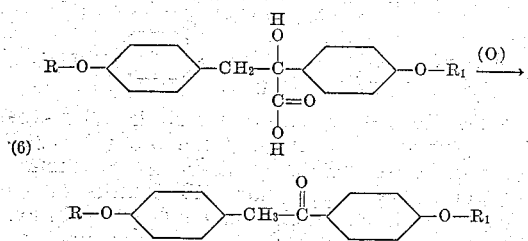

The p-alkoxyphenyl-p-alkoxybenzyl glycollic acid may be prepared from p-alkoxybenzaldehyde and p-alkoxyacetophenone without isolation of any of the intermediate products. For example, an alkali metal, such as sodium, is added in an amount to an alkanol, such as ethanol, equivalent to that required for the reaction of p-alkoxyphenyl-p-alkoxystyryl ketone with hydrogen peroxide. To the alkoxide resulting from the reaction of the alkali metal with the alkanol are added the p-alkoxy... dehyde and p-alkoxyacetoph... koxyphenyl-p-alk... lating thi...

line material begins to separate. (30 to 35 minutes). The mixture is then thoroughly cooled in an ice bath and the crystals collected and washed with cold 50 percent aqueous alcohol. The product, which is 1,3-di-(p-methoxyphenyl)-1,2-epoxypropanone - 3, forms white plates which melt with decomposition at 123°–124° C. (uncorrected). The 1,3-di-(p-methoxyphenyl)-1,2-epoxypropanone-3 is dissolved in 300 cc. of 95 percent ethanol and to this solution is added 30 cc. of 30 percent sodium hydroxide solution. The mixture is refluxed for several hours, during which time the p-methoxyphenyl-p-methoxybenzyl glycollic acid is formed. The clear red-colored solution is diluted with water, cooled and filtered. The filtrate is acidified with hydrochloric acid and the precipitated product is collected, washed with water and dried. The precipitate, which is p-methoxyphenyl-p-methoxybenzyl glycollic acid, melts with decomposition at 174° C. (uncorrected).

The p-methoxyphenyl-p-methoxybenzyl glycollic acid is dissolved in about 200 cc. of glacial acetic acid and cooled to about 30° C. To this solution is added an excess of chromic anhydride dissolved in 80 percent acetic acid. The mixture is stirred for about 10 minutes, during which time the desoxyanisoin is formed, and is then diluted with water. The precipitated solid is extracted with ether. The ether extract is washed with water and dilute sodium hydroxide solution. Evaporation of the ether yields white needles of desoxyanisoin.

EXAMPLE 2.—*Preparation of desoxyanisoin*

A thick paste of 30.2 g. of p-methoxyphenyl-p-methoxybenzyl glycollic acid and 90 cc. of glacial acetic acid is stirred while 69 g. of red lead ($Pb_3O_4$) is added in small portions. The temperature is allowed to rise to 65°–70° C. before external cooling is employed. Gas is evolved and a clear solution results and finally crystalline material begins to separate. During this time, the desoxyanisoin, whcih is the separated crystalline material, is formed and begins to separate. Any excess lead tetracetate is destroyed by adding glycerin to the mixture. The mixture is then diluted with water. The crystalline precipitate is collected by any suitable means, such as filtration, washed with dilute sodium hydroxide and then with water. The dried material, desoxyanisoin, melts at 110° C. (uncorrected). The yield is substantially quantitative.

EXAMPLE 3.—*Preparation of desoxyanisoin*

A solution of 4.6 g. of sodium metal in 80 cc. of 95 percent ethanol is mixed with a solution of 30 g. of p-methoxyacetophenone and 27.2 g. of p-methoxybenzaldehyde in 60 cc. of 95 percent ethanol. After standing at room temperature 30 minutes, 260 cc. of 95 percent ethanol is added and the mixture heated until the crystalline mass is dissolved. The solution is then carefully cooled to 45°–50° C. until crystalline material begins to separate. At this point 50 of 20 percent aqueous hydrogen peroxide is ...ded. The mixture is shaken well and the tem...ature kept below 50° C. by external cooling. ...reaction is usually complete in 30 to 40 min... at 40° to 50° C. The mixture is then cooled ...ice bath and diluted with 100 cc. of ice ... The crystalline product is collected, ...d with cold 50 percent aqueous ethanol and ... The product, 1,3-di-(p-methoxyphenyl)-

Pat

I
of t
col
Let
may
S (

CERTIFICATE OF CORRECTION.

Patent No. 2,326,068. August 3, 1943.

EWALD ROHRMANN

It is hereby certified that error appears in the printed specification of the above numbered patent requiring correction as follows: Page 2, first column, line 34, in the formula, for "$CH_3$" read --$CH_2$--; and that the said Letters Patent should be read with this correction therein that the same may conform to the record of the case in the Patent Office.

Signed and sealed this 16th day of November, A. D. 1943.

(Seal)

Henry Van Arsdale,
Acting Commissioner of Patents.